(12) United States Patent
Price

(10) Patent No.: US 11,801,804 B1
(45) Date of Patent: Oct. 31, 2023

(54) SECURE LOCKING HUB SYSTEM

(71) Applicant: Adam Price, Springfield, OH (US)

(72) Inventor: Adam Price, Springfield, OH (US)

(*) Notice: Subject to any disclaimer, the term of this patent is extended or adjusted under 35 U.S.C. 154(b) by 504 days.

(21) Appl. No.: 17/151,590

(22) Filed: Jan. 18, 2021

Related U.S. Application Data

(63) Continuation-in-part of application No. 16/834,552, filed on Mar. 30, 2020, now Pat. No. 10,974,694, which is a continuation of application No. 15/902,448, filed on Feb. 22, 2018, now Pat. No. 10,640,083.

(51) Int. Cl.
*B60R 25/09* (2013.01)
*B60B 7/16* (2006.01)

(52) U.S. Cl.
CPC ............... *B60R 25/09* (2013.01); *B60B 7/16* (2013.01)

(58) Field of Classification Search
CPC .......... B60R 25/09; B60B 7/16; B60B 27/02; B60B 27/065; B60B 3/16; B60B 25/09; B62D 63/08; F16D 1/10; F16D 2001/103; Y10T 70/5836; Y10T 70/5841
USPC .... 70/225, 226, 237; 301/105.1, 35.58, 111, 301/114
See application file for complete search history.

(56) References Cited

U.S. PATENT DOCUMENTS

| | | |
|---|---|---|
| 5,520,272 A | 5/1996 | Ewer |
| 5,941,105 A | 8/1999 | Macey |
| 7,891,743 B2 | 2/2011 | Ballard |
| 9,382,951 B2 | 7/2016 | Reiner et al. |
| 10,639,931 B2 | 5/2020 | Price |
| 10,640,083 B2 | 5/2020 | Price |
| 2013/0011215 A1 | 1/2013 | Wells |
| 2019/0031140 A1 | 1/2019 | Price |

*Primary Examiner* — Suzanne L Barrett
(74) *Attorney, Agent, or Firm* — ADAMSIP, LLC; James Adams; Stephen Thompson

(57) ABSTRACT

A secure locking hub system for locking a wheel hub of a vehicle to an axle is provided. The system has a locking ring that may be manually inserted and removed by a user to switch the system between locked and unlocked configurations. When in the locked configuration, the hub is in a rotationally fixed position relative to the axle on which the hub is mounted. With the hub locked to the axle, the wheel will not rotate and the vehicle thus cannot be moved. The system additionally has a security lock that prevents any unauthorized individual from removing the locking ring, thereby preventing theft of the vehicle.

18 Claims, 7 Drawing Sheets

SECURE LOCKING HUB SYSTEM

CROSS REFERENCES

This application is a continuation-in-part of U.S. Application Ser. No. 16/834,552, filed on Mar. 30, 2020, which is a continuation of U.S. Application Ser. No. 15/902,448, filed on Feb. 22, 2018, which applications are incorporated herein by reference.

FIELD OF THE INVENTION

The present invention relates generally to a secure locking hub system designed to prevent theft of a vehicle.

BACKGROUND

Trailers pulled by powered vehicles may be used to transport a variety of goods or materials, such as cargo, tools, equipment, vehicles, or livestock. Thus, many types of trailers have been designed for different purposes. These may include enclosed cargo trailers, flatbed trailers, boat trailers, vehicle trailers, livestock trailers, or dollies. Other types of trailers may be adapted to provide shelter, such as construction trailers or travel trailers. Trailers are typically attached to a powered vehicle using a hitch, which is used to tow the trailer behind the motor vehicle from location to location. The trailer may be detached from the vehicle by removing the trailer from the hitch.

Trailers are often a target of theft due to the value of the trailer itself as well as the value of items stored within the trailer. Hitch coupler locks are commonly used to prevent theft of trailers by securely latching a coupler onto a ball on the trailer hitch and locking the coupler into place. A coupler lock system locks a trailer to a vehicle hitch when the trailer is hitched to the vehicle and may also prevent an unhitched trailer from being hitched to a vehicle. However, hitch coupler lock systems generally use an exposed lock, such as a padlock, which may be cut by lock cutters or otherwise compromised in order to facilitate removing a hitched trailer from a vehicle and/or allowing an unhitched trailer to be hitched to a vehicle for the purpose of stealing the trailer. In addition, if the coupler or the latching mechanism of a coupler lock system fails, the locking system may be rendered inoperable. Further, coupler lock systems are used strictly for trailers having a coupler designed to be latched onto a ball hitch and thus cannot be used to prevent theft of a motorized vehicle, such as a car, motorcycle, recreational vehicle (RV), golf cart, electric conveyance vehicle (ECV), or similar types of vehicles.

Some attempts have been made to provide a security system for locking a vehicle wheel hub to prevent theft of the vehicle. In some known systems, an actuator may be utilized to actuate a locking ring that locks a hub onto an axle. The locking ring is operably connected to a cam that moves the locking ring to engage with the axle and to disengage from the axle in order to rotationally lock and unlock the hub to prevent or allow rotational movement of the hub. The cam moves in response to rotational movement of a component of the actuator by a user. Operation of the actuator may be limited by a locking mechanism to prevent unauthorized use. Some disadvantages to such systems are that inclusion of an actuating mechanism generally increases the overall size of the system, which is undesirable as the system is attached to the outside of a wheel hub of a vehicle, and that the actuating mechanism typically requires numerous interconnected parts, which increases the complexity, as well as manufacturing costs, of the system.

Accordingly, a need exists in the art for an improved system for locking wheel hubs in order to prevent theft of various types of conveyance vehicles.

SUMMARY

In one aspect, a secure locking hub system for locking a wheel hub of a conveyance vehicle to an axle is provided. The system locks a wheel hub in a rotationally fixed position relative to the axle and has security features designed to prevent unauthorized unlocking of the hub. Securely locking the wheel in a rotationally fixed position prevents theft of the vehicle by preventing the vehicle from being moved by an unauthorized person through normal operation of the vehicle. The locking hub system may be installed on an axle of a motorized or non-motorized vehicle and is preferably installed on an axle that is mounted on the vehicle in a rotationally fixed position. Multiple locking hub systems may be installed on one or more individual wheels of the vehicle, respectively, to provide greater security.

The system includes a hub that may be rotatably coupled to an axle with a wheel mounted on the hub. The system may be manually switched between a locked configuration and an unlocked configuration. When in the locked configuration, the hub and the wheel mounted thereon will not rotate on the axle. With at least one wheel hub of a conveyance vehicle in a rotationally locked position relative to the axle, the vehicle cannot move through normal rotation of the wheel. When in the unlocked configuration, the hub and wheel mounted thereon may freely rotate so that the vehicle may be operated in a normal manner. A security lock secures the locking hub system to prevent any unauthorized individual from unlocking the wheel hub from the axle once the hub is locked onto the axle. Thus, the security lock prevents unauthorized movement of the vehicle and thus prevents theft.

The locking hub system comprises a hub coupled to an axle, a manually positionable locking ring, a hub cap, and a lock. The hub has interior splines, and the axle has exterior splines. The locking ring has both interior splines and exterior splines. The exterior splines of the locking ring are configured to mate with the interior splines of the hub, and the interior splines of the locking ring are configured to mate with the exterior splines of the axle. The locking ring may be manually inserted by a user into an annular space between the axle and the hub to lock the hub in a rotationally fixed position relative to the axle. In this locked configuration, the exterior splines of the locking ring are mated with the interior splines of the hub and the interior splines of the locking ring are mated with the exterior splines of the axle, thereby preventing rotation of the hub on the axle. The locking ring may also be manually removed from the annular space between the axle and the hub. In this unlocked configuration, the hub is free to rotate about the axle. The locking ring preferably has a handle pivotally connected to the locking ring by a hinge. The handle facilitates manual insertion and removal of the locking ring.

The hub cap may be locked onto the hub to enclose the interior of the hub, including the annular space between the hub and the axle, as well as internal components of the hub, including the locking ring and a distal end of the axle. The lock is configured to securely lock the hub cap onto the hub. When the hub cap is locked onto the hub with the locking ring inserted into the annular space, the locking ring cannot be removed from the interior of the hub. Thus, the locking ring is retained in place by the hub cap with the exterior and interior splines of the locking ring mated with the hub and the axle, respectively, thereby preventing rotation of the hub on the axle. The locking ring is inaccessible from an exterior of the hub when the hub cap is locked onto the hub. Thus, the locking ring may not be removed without first unlocking the lock and removing the hub cap from the hub, which prevents unauthorized removal of the locking ring. When the lock is unlocked, the hub cap may then be removed from the hub. Once removed, the locking ring may be manually removed from the annular space so that the hub may rotate freely on the axle for normal operation of the vehicle. The hub cap may be reinstalled with the locking ring removed to enclose the interior of the hub during normal vehicle operation. When the user wants to lock the hub to the axle to prevent theft of the vehicle, the hub cap may be unlocked from the hub and removed, and the locking ring may then be manually re-inserted into the annular space to rotationally lock the hub in place, thereby preventing rotational movement of the wheel hub.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As used herein, the term "conveyance vehicle" may refer to any type of motorized or non-motorized vehicle having wheels that may be used for transporting people or goods. A conveyance vehicle may include, but is not limited to, non-motorized vehicles such as a trailer, which may include enclosed cargo trailers, flatbed trailers, boat trailers, vehicle trailers, livestock trailers, or dollies, other non-motorized vehicles such as a wagon or bicycle, and motorized vehicles such as a car, motorcycle, recreational vehicle (RV), motor home, golf cart, electric conveyance vehicle (ECV), or scooter. As used herein, the term "axle" refers to any component of a conveyance vehicle that provides a structure for rotatably coupling a wheel hub thereto. As used herein, the term "locked configuration" indicates a locking ring has been installed between the axle and the wheel hub so that the hub will not rotate on the axle, and the term "unlocked configuration" indicates that the locking ring has been removed so that the hub can rotate freely on the axle.

Figure 1:
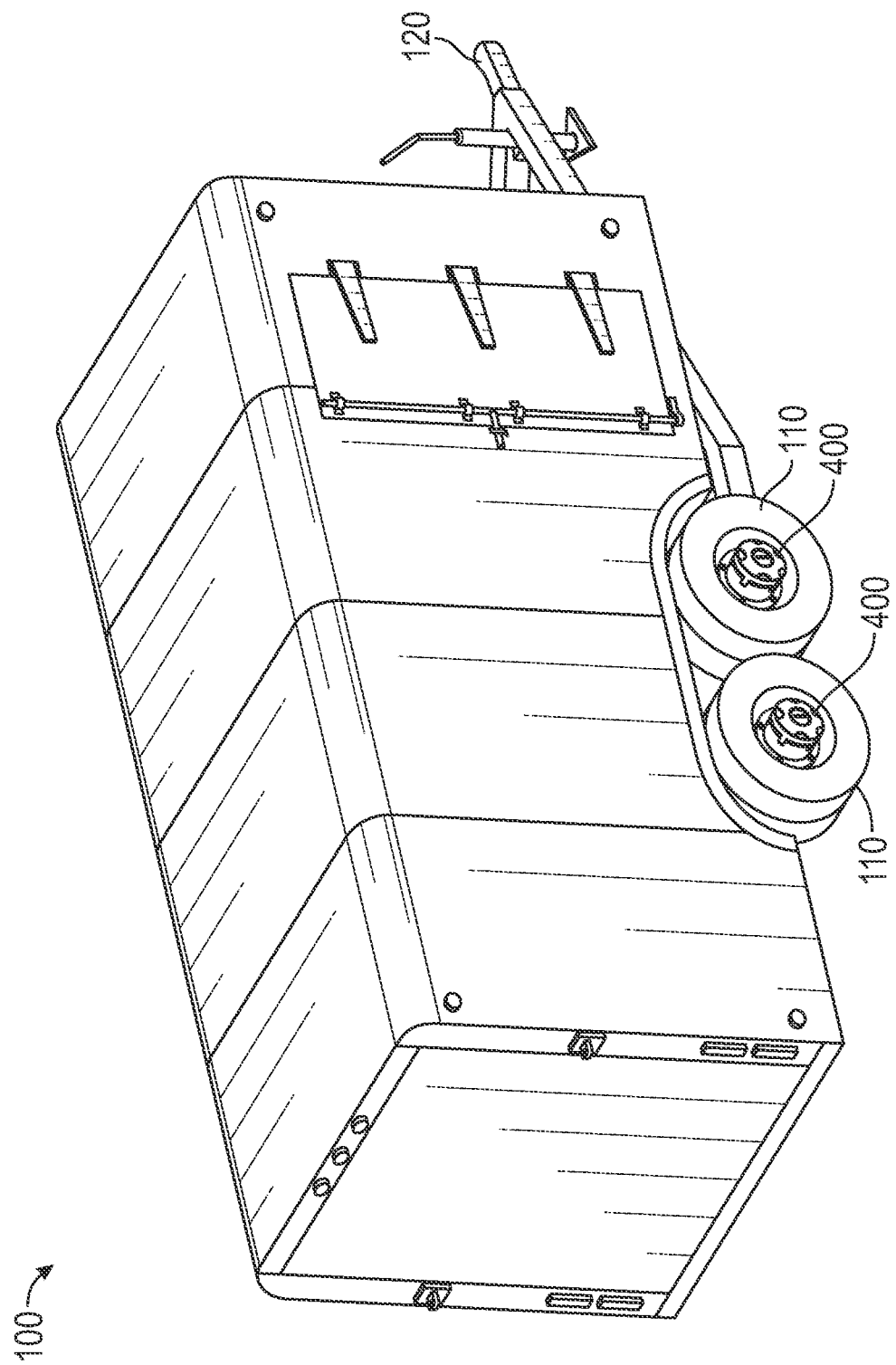
FIG. 1 shows a perspective view of a conveyance vehicle including a locking hub system for locking and unlocking a wheel hub to an axle in accordance with the present disclosure.

Turning now to the drawings, FIG. 1 shows an enclosed cargo trailer 100, which is one example of a conveyance vehicle on which a locking hub system may be installed. The trailer 100 has two wheels 110 on each side with each wheel having a locking hub system 400 for locking the wheel. Each wheel 110 is mounted on a hub 212 that is rotatably coupled to and positioned around an axle 202, of which an end portion can be seen in FIGS. 2-5. The trailer 100 has a coupler 120 for hitching the trailer to a trailer hitch ball attached to a motorized vehicle for hauling the trailer.

The trailer axle 202 is mounted in a rotationally fixed position and thus does not rotate when the vehicle 100 is in motion. The hub 212 supporting the wheel 110 is coupled to the axle 202 and is supported by bearings so that the hub 212 and wheel 110 may rotate about the axle while the axle 202 remains in a fixed position. The trailer 100 shown in FIG. 1 may have a single axle that supports a set of two opposing wheels, or may have individual axles that support each individual wheel 110.

Figure 4:
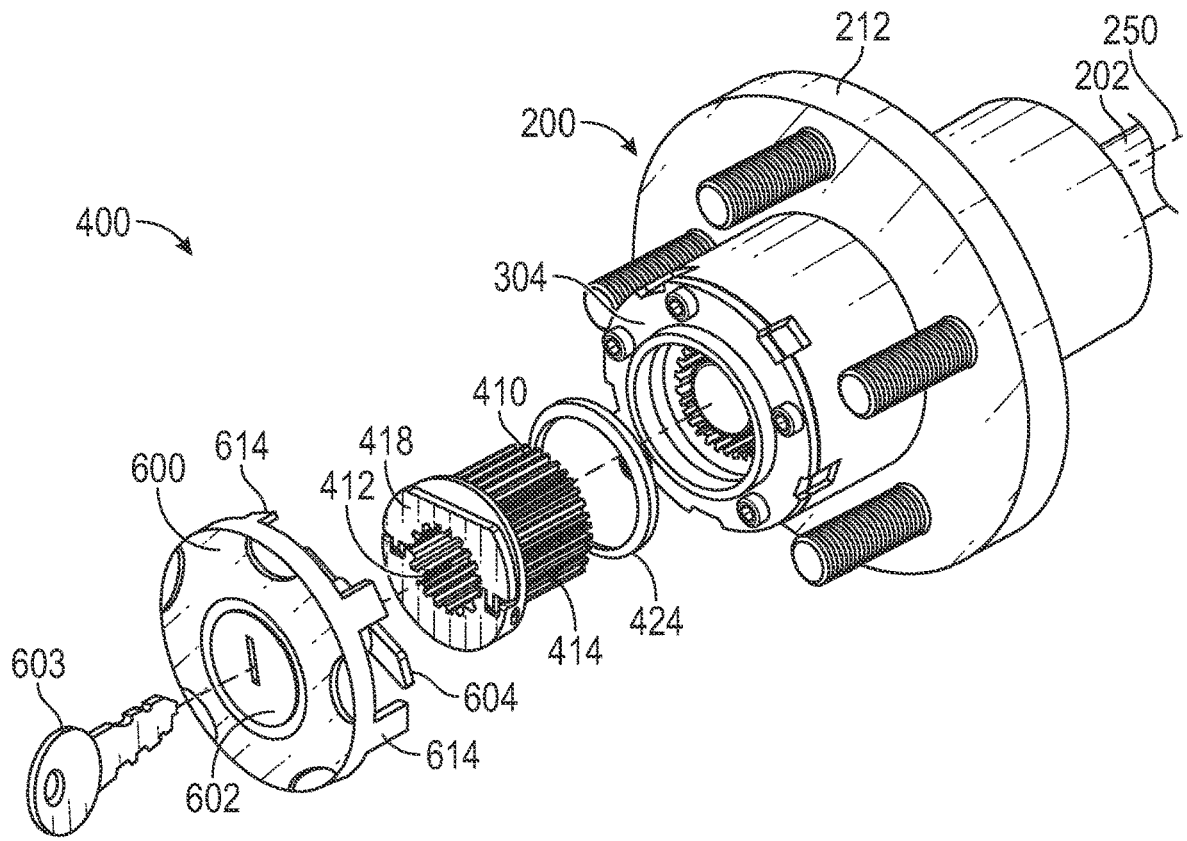
FIG. 4 shows an exploded view of a locking hub system in accordance with the present disclosure.
Figure 5:
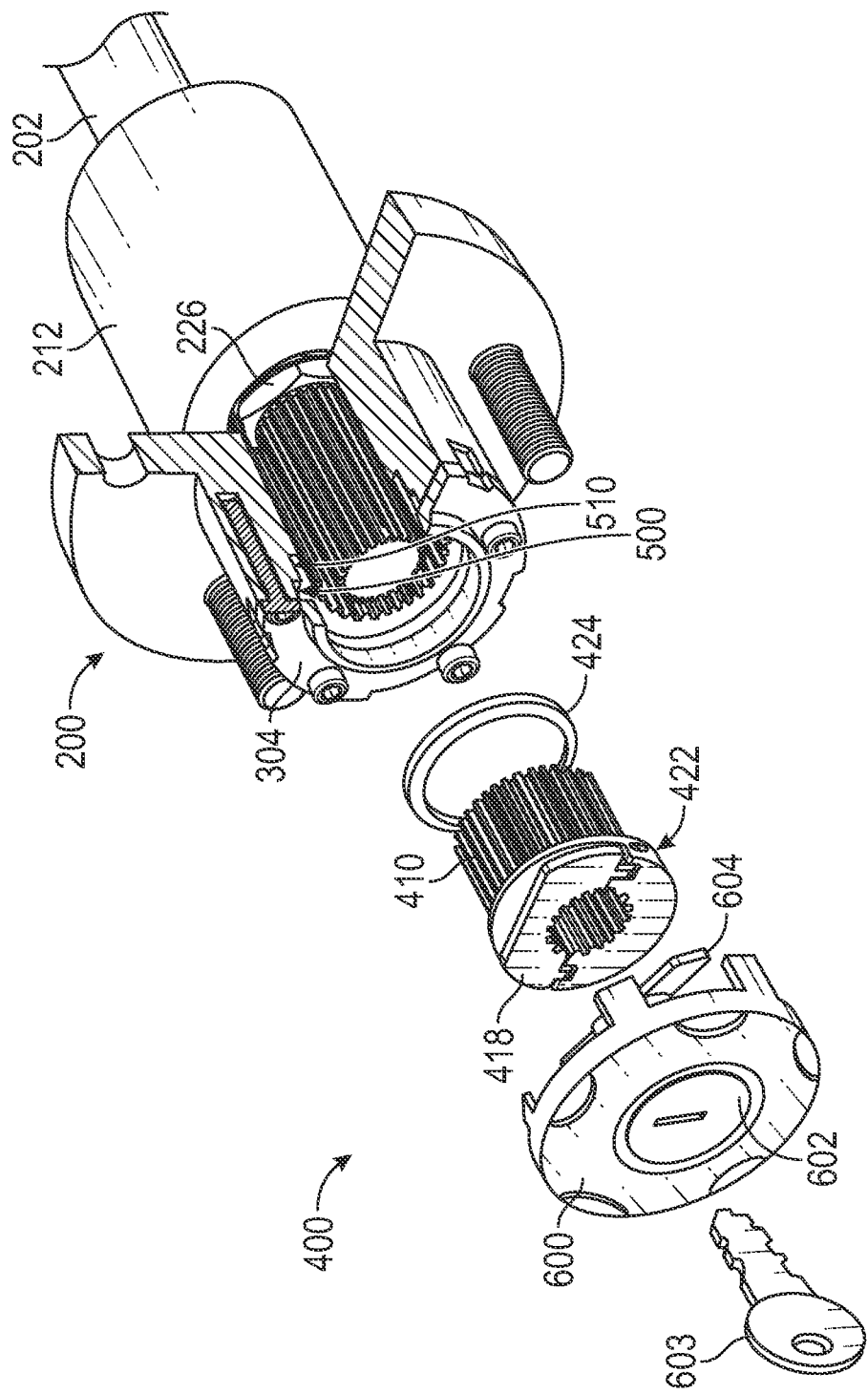
FIG. 5 shows an exploded view of a locking hub system with a partial view of a hub in accordance with the present disclosure.

FIGS. 4 and 5 show exploded views of an illustrative locking hub system 400 that may be used to lock the wheel 110 of the trailer 100 shown in FIG. 1 in a rotationally fixed position relative to the axle 202. The system 400 has security features designed to prevent unauthorized unlocking of the wheel hub 212 and thus prevent theft of the vehicle 100 by preventing the vehicle from being moved by an unauthorized person through normal operation of the vehicle. To prevent theft, the secure locking hub system 400 should be installed on a fixed axle (i.e., an axle that does not rotate), which generally includes axles of non-motorized vehicles. On motorized vehicles, at least one axle rotates to drive the motion of the vehicle, but the system 400 may also be installed on a non-rotating axle of a motorized vehicle to prevent theft of the vehicle. Multiple locking hub systems 400 may be installed on one or more individual wheels 110 of the vehicle, respectively, to provide greater security.

As shown in FIGS. 4 and 5, the locking hub system 400 comprises a hub 212 coupled to an axle 202, a manually positionable locking ring 410 that may be used to lock the hub 212 in a rotationally fixed position relative to the axle 202, a hub cap 600 and a lock 602 configured to securely lock the hub cap 600 onto the hub 212.

The system 400 may be manually switched between a locked configuration and an unlocked configuration. When in the locked configuration, the hub 212 and the wheel 110 mounted thereon are locked such that the hub and wheel will not rotate on the axle 202. With at least one wheel hub 212 of a conveyance vehicle 100 in a rotationally locked position relative to the axle 202, the vehicle cannot move by normal rotation of the wheel 110. When in the unlocked configuration, the hub 212 and wheel 110 mounted thereon may rotate freely so that the vehicle 100 may be operated in a normal manner. A security lock 602 secures the locking hub system 400 to prevent any unauthorized individual from unlocking the wheel hub 212 from the axle 202 once the hub is locked onto the axle. Thus, the security lock 602 prevents unauthorized movement of the vehicle 100. In a preferred embodiment, a unique key 603 configured to operate the lock 602 may be used by an authorized individual to unlock the lock 602, which then allows the authorized individual to manually switch the system 400 between the locked and unlocked configurations.

Figure 2:
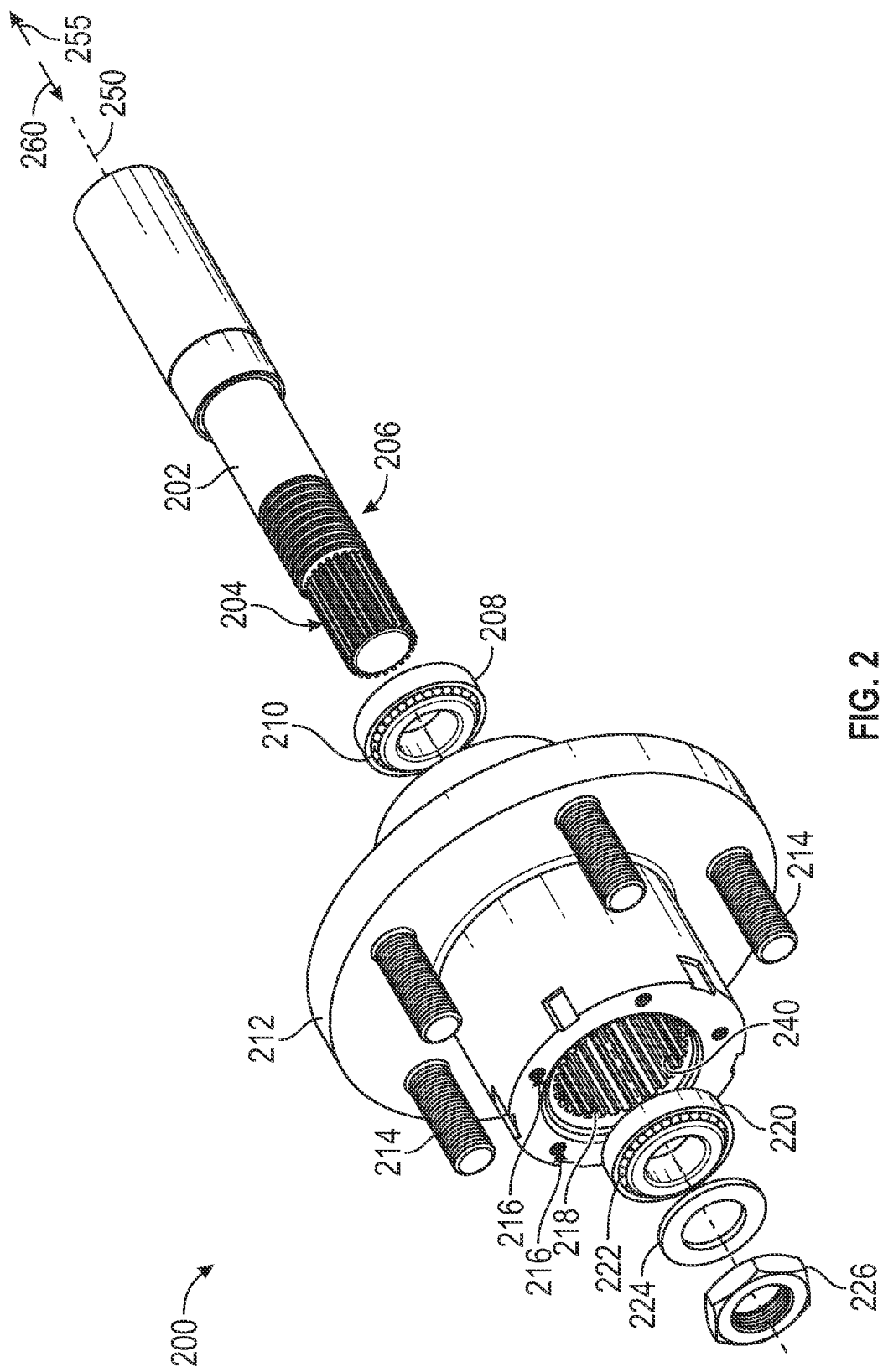
FIG. 2 shows an exploded view of a hub assembly for use in a locking hub system in accordance with the present disclosure.
Figure 11:
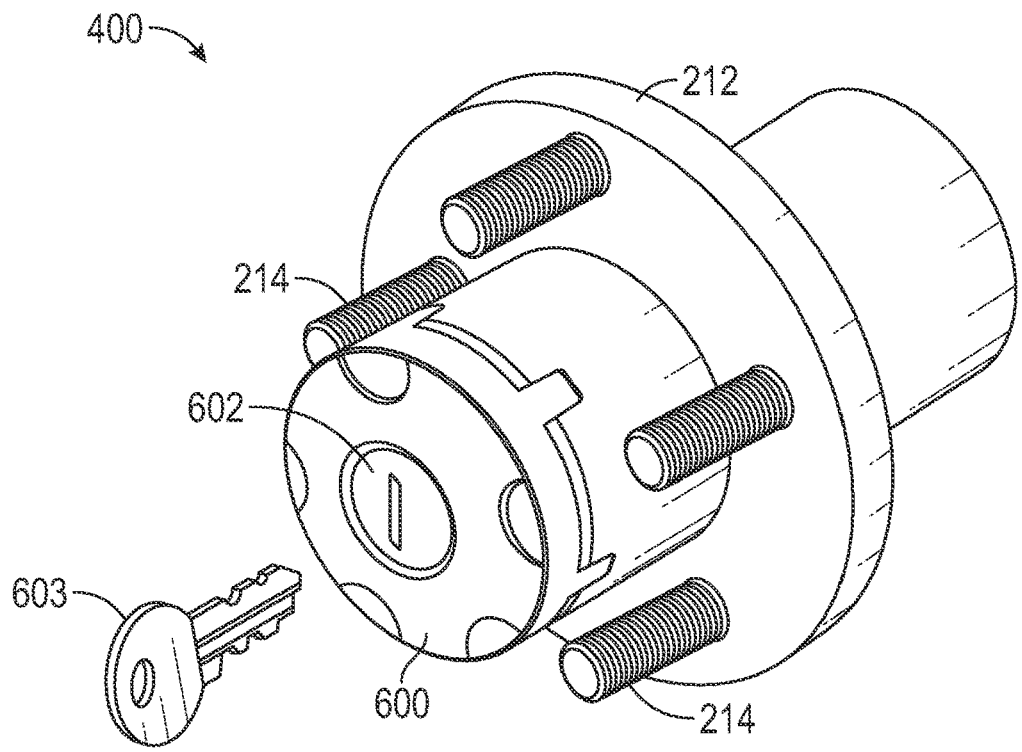
FIG. 11 shows a perspective view of an assembled locking hub system in accordance with the present disclosure.
Figure 12:
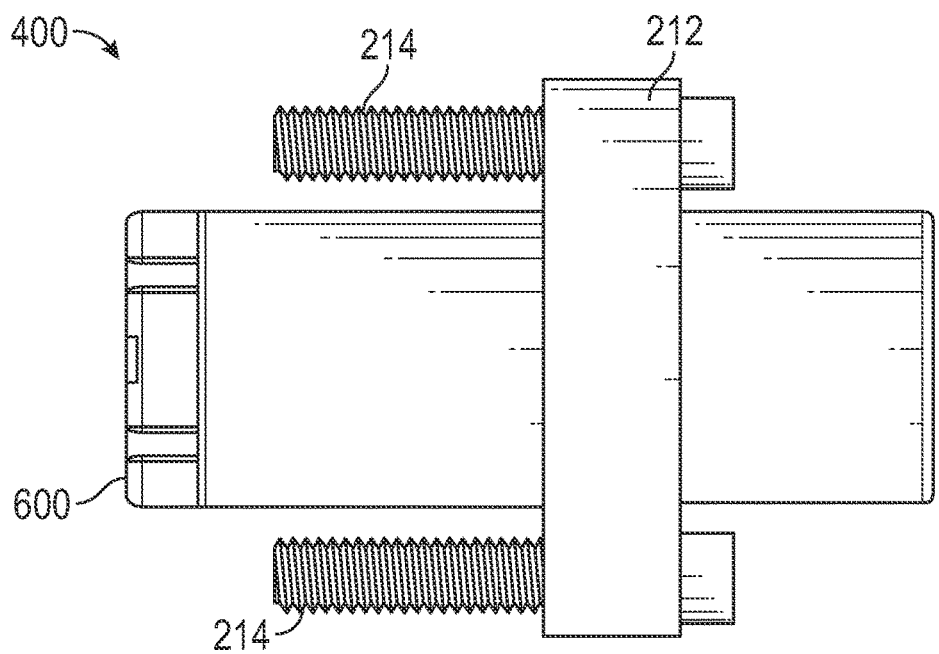
FIG. 12 shows a side elevational view of an assembled locking hub system in accordance with the present disclosure.

FIG. 2 shows an exploded view of a hub assembly 200 that may be utilized with the locking hub system 400. The hub assembly 200 comprises a hub 212 rotatably coupled to and positioned around an axle 202. The hub 212 rotates about a central axis 250 when the vehicle 100 is in motion so that a wheel 110 mounted on the hub rotates with the hub. As used herein, an inward direction refers to a direction extending axially inward relative to the axle 202, as shown in FIG. 2, and an outward direction refers to a direction extending in the opposite direction axially outward and toward a hub cap 600 that is accessible from the exterior of the assembled locking hub system 400, as best seen in FIGS. 11 and 12. Arrow 255 indicates an inward direction, and arrow 260 indicates an outward direction. As best seen in FIG. 2, the hub 212 has interior splines 240 disposed on an internally facing surface of the hub 212 and positioned around an internal circumference of the hub 212.

The hub 212 is supported on the axle 202 by at least one bearing so that the hub 212 and wheel 110 may rotate about the axle 202. Preferably, as shown in FIG. 2, the hub assembly 200 comprises an inner bearing 208 having a series of rollers 210 and an outer bearing 220 also having a series of rollers 222. An outer surface of each bearing 208 and 220 may function as a race that, when installed in the hub 212, is in face sharing contact with an inner surface of the hub 212 so that the outer surface of each bearing 208 and 220 rotates with the hub 212 on rollers 210 and 222. Other suitable types of bearings may be utilized for rotatably coupling the hub 212 to the axle 202. The hub 212 preferably has outwardly facing bolts 214 for mounting a wheel 110 on the hub 212.

To install the hub assembly 200 for use in the locking hub system 400, the inner bearing 208 and outer bearing 220 may be installed within the hub 212. The hub 212 may then be installed around the axle 202 through a central opening 218 of the hub 212 so that an inner surface of each bearing 208 and 220 are in face sharing contact with a smooth surface portion of the axle 202. A bearing seal may be utilized to prevent grease from leaking out and water from getting into the hub 212 after installation. The hub 212 may then be secured to the axle 202 with a fastener. Preferably, as shown in FIG. 2, a thrust washer 224 is installed between the outer bearing 220 and a hub nut 226 that secures the hub 212 and bearings 208 and 220 on the axle 202. The hub nut 226 may be threaded onto a male threaded section 206 of the axle 202. The threaded section 206 preferably has helical threads that are compatible with helical threads on the hub nut 226. A second nut may optionally be utilized to ensure that the hub nut 226 does not become loose during use of the hub assembly 200. The bearings 208 and 220 support the hub 212 on the axle 202, and the fastener 226 secures the assembly 200 to the axle 202.

Figure 3:
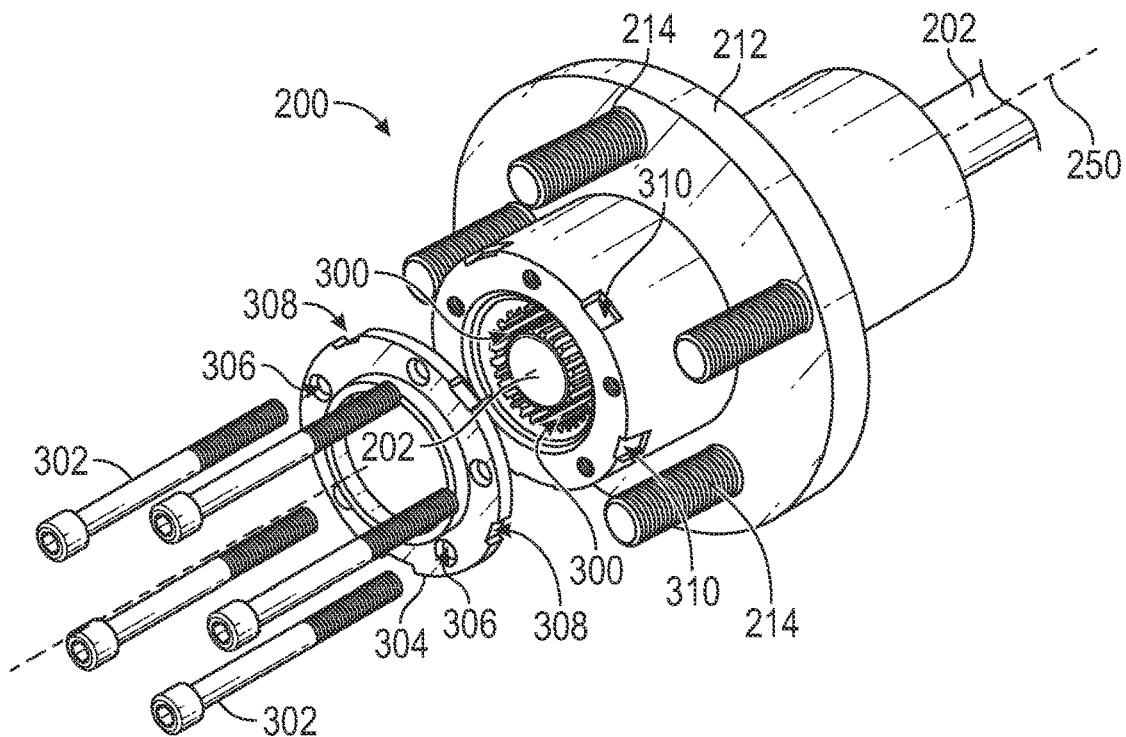
FIG. 3 shows an exploded view of a hub assembly for use in a locking hub system in accordance with the present disclosure.
Figure 6:
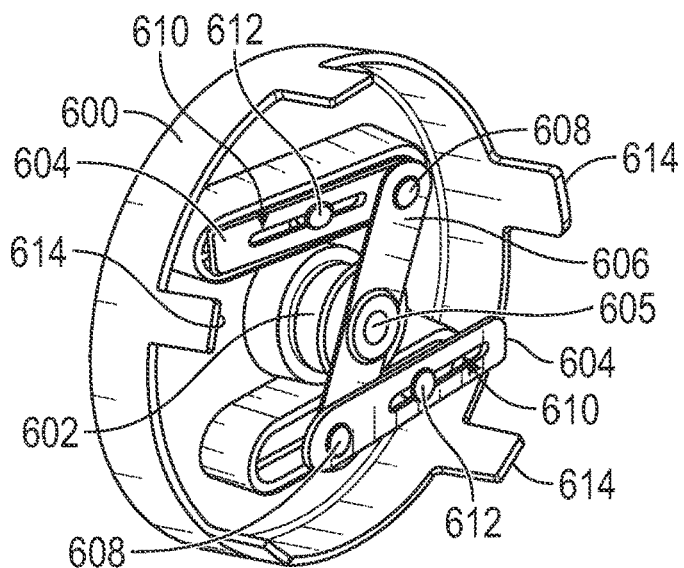
FIG. 6 shows a perspective view of a hub cap for use in a locking hub system in accordance with the present disclosure.

As shown in FIG. 3, in a preferred embodiment, the hub assembly 200 includes the hub 212 and an end plate 304 that may be fastened to the hub 212 using threaded bolts 302. The end plate 304 has a shape that conforms to the outer shape of an end of the hub 212 to which the end plate 304 is fastened. The end plate 304 has a central opening that aligns with the central opening 218 of the hub 212. The end plate 304 may have openings 306 that align with threaded holes 216 on the hub 212 for fastening the end plate 304 to the hub 212 using the bolts 302. The outer bearing 220 may be installed in the hub 212 and the hub nut 226 may be used to rotatably secure the hub 212 onto the axle 202, preferably before installation of the end plate 304 onto the hub 212. FIG. 4 illustrates the hub assembly 200 with the end plate 304 installed on the hub 212. In a preferred embodiment, the end plate 304 has indentations 308 spaced around the outer circumference of the end plate 304 that align with spaced indentations 310 on the hub 212, as best seen in FIG. 4. In a preferred embodiment, as best seen in FIG. 6, the hub cap 600 has downwardly facing extensions 614 spaced around the outer circumference of the hub cap 600. The aligned indentations 308, 310 are sized and shaped to receive the downward extensions 614 on the cap 600, as best seen in FIG. 11. The spaced indentations 308, 310 may aid in properly aligning the cap 600 with the hub 212 when installing the cap 600 onto the hub 212.

Figure 7:
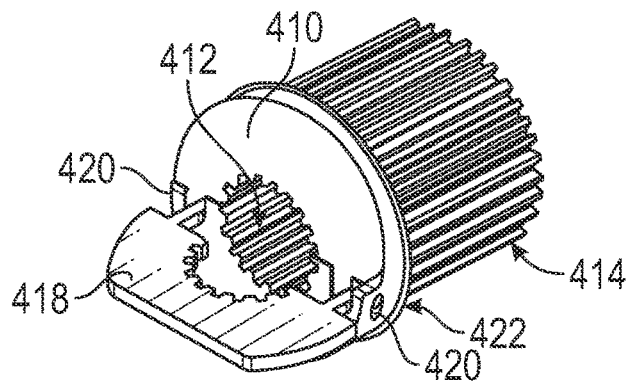
FIG. 7 shows a perspective view of a locking ring for use in a locking hub system in accordance with the present disclosure.
Figure 8:
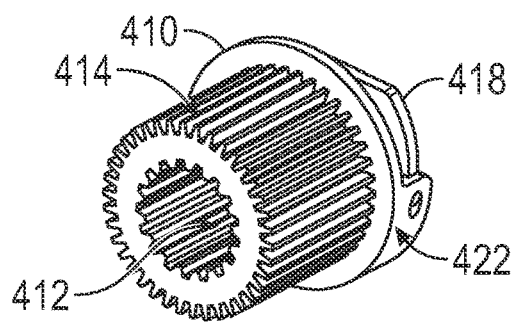
FIG. 8 shows a perspective view of a locking ring for use in a locking hub system in accordance with the present disclosure.
Figure 9:
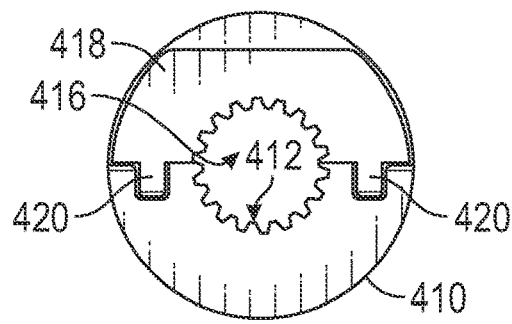
FIG. 9 shows a top plan view of a locking ring for use in a locking hub system in accordance with the present disclosure.

As best seen in FIGS. 7-9, the locking ring 410 has interior splines 412 and has exterior splines 414. The interior splines 412 are disposed on an internally facing surface of the locking ring 410 and positioned around an internal circumference of a central opening 416 extending lengthwise through the locking ring 410, as best seen in FIG. 9.

FIG. 8 shows a lower end of the locking ring 410. The exterior splines 414 are disposed on an outwardly facing surface of the locking ring 410 and positioned around an outer circumference of the locking ring 410. In addition, as best seen in FIG. 2, the axle 202 has exterior splines 204 disposed around an outer circumference of the axle 202. In a preferred embodiment, the exterior splines 204 on the axle 202 are disposed at a distal end of the axle 202 in an outward direction 260 from the threaded section 206 of the axle 202. The exterior splines 414 of the locking ring 410 are configured to mate with the interior splines 240 of the hub 212, and the interior splines 412 of the locking ring 410 are configured to mate with the exterior splines 204 of the axle 202. As best seen in FIG. 3, when the hub assembly 200 is installed on the axle 202, the hub 212 forms an annular space 300 around the axle 202. The locking ring 410 is sized and shaped to fit into the annular space 300 so that the exterior splines 414 are engaged with the interior splines 240 of the hub 212 and the interior splines 412 are engaged with the exterior splines 204 of the axle 202, thereby preventing rotation of the hub 212 and wheel 110 mounted thereon relative to the axle 202, which is mounted in a rotationally fixed position.

Thus, the hub 212 is rotationally fixed relative to the axle 202 when the exterior splines 414 of the locking ring 410 are mated with the interior splines 240 of the hub 212 and the interior splines 412 of the locking ring 410 are mated with the exterior splines 204 of the axle 202. The splines 412, 414 of the locking ring 410, the splines 240 of the hub 212, and the splines 204 of the axle 202 allow the locking ring 410 to slidably move in an axial direction, either inwardly 255 or outwardly 260, relative to the hub 212 and the axle 202, but prevent rotational movement of the locking ring 410. Thus, the system 400 may be set in the locked configuration by manually inserting the locking ring 410 in an inward direction 255 into the annular space 300 between the hub 212 and axle 202. Similarly, the system 400 may be set in the unlocked configuration by manually removing the locking ring 410, which may be done by pulling the locking ring 410 in an outward direction 260 out of the annular space 300. When the locking ring 410 is removed, the hub 212 is free to rotate about the axle 202, thereby allowing normal operation of the vehicle 100. It should be understood by one of ordinary skill in the art that any suitable type of joint between the locking ring 410 and the hub 212 and axle 202 that allows relative axial movement of the locking ring 410 but prevents relative rotational movement, such as a keyed joint, may be utilized and still fall within the scope of the present disclosure.

Figure 13:
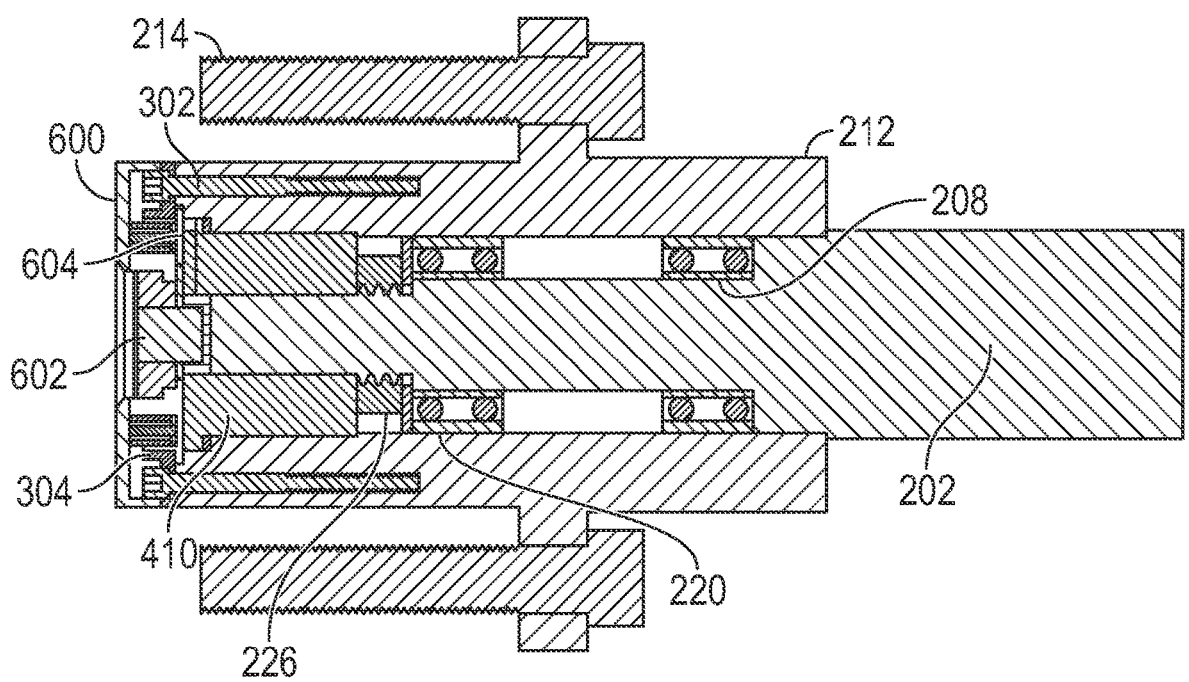
FIG. 13 shows a cross-sectional view of the locking hub system shown in FIG. 12 with the locking ring inserted within an interior of the hub.

FIG. 13 shows a cross-sectional view of the locking hub system 400 in the locked configuration with the locking ring 410 inserted within an interior of the hub 212 and into the annular space 300 around the axle 202. The locking ring 410 is manually positionable within the interior of the hub 212 when the hub cap 600 is removed from the hub 212. As used herein, the term "manually positionable" indicates that the locking ring 410 may be manually inserted into the interior of the hub 212 and manually removed from the interior of the hub 212 by a user simply manually sliding the locking ring 410 in an inward 255 or outward 260 axial direction, which either engages the locking ring 410 with or disengages the locking ring 410 from the hub 212 and the axle 202. Thus, the term "manually positionable" indicates that the locking ring 410 is a separate individual component that is not fastened to or operably connected to any other individual component of the system 400 in a way that would prevent the locking ring 410 from being physically separated from any individual component by manually sliding the locking ring 410 away from such a component. The term "manually positionable" further indicates that the position of the locking ring 410 within the assembled system 400 cannot be moved by another component of the system 400. For instance, the locking ring 410 is not operably connected to any type of actuating device that automatically moves the locking ring in response to input from another component. Thus, they system 400 may be switched between the locked and unlocked configurations only by a user manually inserting or removing the locking ring 410.

In a preferred embodiment, as best seen in FIGS. 4 and 7, to facilitate manual insertion and removal of the locking ring 410, the locking ring 410 may comprise a handle 418. As shown in FIG. 7, the handle 418 may be pivotally connected to the locking ring 410 by hinges 420 so that the handle 418 can be pivoted upward so that a user can manually insert the locking ring 410 into the annular space 300 or manually remove the locking ring 410 from the annular space 300. Once the locking ring 410 is manually inserted into the annular space 300 so that the system 400 is in the locked configuration, the handle can be folded downward, as shown in FIG. 4, to minimize the size of the locking ring 410.

As best seen in FIG. 11, the locking hub system 400 further comprises a hub cap 600 and a lock 602 configured to securely lock the hub cap 600 onto the hub 212. The hub cap 600 is removable from the hub 212 when the lock 602 is unlocked and securely locked onto the hub 212 when the lock 602 is locked with the hub cap 600 positioned on an outward 260 end of the hub 212. The lock 602 is preferably a keyed lock, such as a cam lock, that may be locked or unlocked by an authorized individual in possession of a unique key 603 configured to operate the lock 602. In alternative embodiments, the lock 602 may be a keyless lock, such as a key code lock or a combination lock, or any other type of lock suitable for securing the hub cap 600 to the hub 212 and releasing the hub cap 600 from the hub 212. In a preferred embodiment, the lock 602 is integrally attached to the cap 600 so that the components are fixed together to form a single unit that may be used to cap the outwardly 260 facing end of the hub 212.

When the locking ring 410 is inserted into the annular space 300 within the interior of the hub 212 and the hub cap 600 is locked onto the hub 212, the locking ring 410 cannot be removed from the interior of the hub 212. Thus, in the locked configuration, the locking ring 410 is retained within the interior of the hub 212 by the hub cap 600 with the exterior splines 414 and interior splines 412 of the locking ring 410 mated with the hub interior splines 240 and the axle splines 204, respectively. In the locked configuration, the hub 212 will not rotate about the axle 202, and the locking ring 410 is inaccessible from an exterior of the hub 212. To access the locking ring 410 to switch the system to the unlocked configuration, an authorized user may unlock the lock 602, which releases the hub cap 600 for removal from the hub 212. The user may remove the hub cap 600 from the hub 212 and then manually remove the locking ring 410 by pulling the locking ring 410 from the interior of the hub 212 and completely removing the locking ring 410 from the system 400, thereby switching the system 400 into the unlocked configuration by disengaging the locking ring 410 from both the hub 212 and the axle 202. As best seen in FIG. 4, the handle 418 may have a flat upper end that provides the user with space to engage and manually pivot the handle 418 upward and then use the handle 418 to manually pull the locking ring 410 in an outward axial direction 260 out of the annular space 300. Once in the unlocked configuration, the cap 600 is preferably installed back onto the hub 212 and locked in place on the hub 212. The hub 212 may then rotate freely about the axle 202, and thus the vehicle 100 may be operated in a normal manner.

The locking ring 410 may be stored separately from the locking hub system 400 while the system is in the unlocked configuration for normal operation of the vehicle 100. When the need arises to lock the wheel 110 of the vehicle 100, the user may then switch the system 400 back into the locked configuration by first unlocking the lock 602 and removing the hub cap 600. The user may then manually insert the locking ring 410 into the annular space 300 within the interior of the hub 212 so that the exterior splines 414 and interior splines 412 of the locking ring 410 are engaged with the hub interior splines 240 and the axle splines 204, respectively. The hub 212 and wheel 110 will then be rotationally locked to the fixed axle 202, thereby preventing normal operation of the vehicle 100. The hub cap 600 may then be locked back onto the hub 212 to prevent any unauthorized individual from being able to access the locking ring 410, which thereby prevents such an unauthorized individual from being able to switch the locking hub system 400 back into the unlocked configuration. Thus, the present locking hub system 400 may be utilized to prevent theft of a vehicle 100.

FIG. 6 illustrates the inward 255 facing side of an illustrative hub cap 600 with an integrally attached lock 602 that may be utilized with the present system 400. The lock 602 is configured to securely lock the hub cap 600 onto the hub 212. In a preferred embodiment, the hub cap 600 has downward facing extensions 614 spaced around the outer circumference of the hub cap 600 that align with the indentations 308 and 310 on the hub assembly 200 to aid in properly aligning the cap 600 with the hub 212 when installing the cap 600 onto the hub 212. In a preferred embodiment, as shown in FIG. 6, the keyed lock 602 comprises opposing levers 604 configured to extend and to retract in response to input from a key 603 in order to lock and to unlock the lock 602, respectively. The levers 604 may be pivotally attached to opposing ends of an arm 606 by pins 608. The arm 606 may be attached at a center point of the arm 606 to a cam 605 that rotates in response to input from the key 603, thereby causing the levers 604 to extend and to retract, depending on the input from the key 603. In a preferred embodiment, each lever 604 may have a longitudinal slot 610 positioned around a fixed guide pin 612 that guides linear motion of the lever 604 as the lever 604 extends or retracts.

In a preferred embodiment, as best seen in FIG. 5, the hub 212 has a circular groove 500 positioned around an internal circumference of the hub 212, and the levers 604 of the lock 602 may be extended so that the levers 604 are inserted into the groove 500 in response to actuating the lock 602, which is preferably in response to input from a key 603, which securely locks the hub cap 600 onto the hub 212. When the levers 604 of the lock 602 are retracted, the levers 604 are withdrawn from the groove 500, which allows the hub cap 600 to be removed from the hub 212. Thus, the hub cap 600 may be locked onto the hub 212, but the hub cap 600 is not otherwise fastened to or connected to the hub 212, such as by bolts or any other types of fasteners. The hub cap 600 is retained securely in place capping the end of the hub 212 by only the lock 602. When the lock 602 is unlocked, the hub cap 600 is not retained by any other fasteners. Thus, a user may remove the hub cap 600 from the hub 212 by unlocking the lock 602 and then simply pulling the hub cap 600 in an outward direction 260 to physically separate the hub cap 600 from the hub 212. The user may then secure the hub cap 600 back onto the hub 212 by positioning the hub cap 600 onto the end of the hub 212, as shown in FIG. 11, and locking the lock 602.

In a preferred embodiment, as best seen in FIG. 5, the circular groove 500 may be defined by a junction between the hub 212 and the end plate 304. The hub 212 may have a circular indentation disposed around an internal circumference of the hub 212, and the central opening of the end plate 304 may have a smaller diameter than the diameter of the circular indentation such that the circular groove 500 is formed between the end plate 304 and hub 212 when the end plate 304 is securely fastened to the hub 212, as shown in FIG. 5. In an alternative embodiment, the hub 212 and end plate 304 may be a unitary piece of material with a circular groove 500 formed therein. FIG. 13 shows the opposing levers 604 of the lock 602 both inserted into the circular groove 500, thereby securing the hub cap 600 on the hub 212. When the hub cap 600 is locked onto the hub 212, the cap 600 covers the heads of the bolts 302 that fasten the end plate 304 to the hub 212 so that the bolts 302 cannot be removed unless the hub cap 600 is removed from the hub 212.

In a preferred embodiment, as best seen in FIG. 5, the hub 212 has an additional second circular indentation 510 positioned around an internal circumference of the hub 212. The second circular indentation 510 has a smaller internal diameter than the circular groove 500 and is positioned inward 255 from the circular groove 500. As best seen in FIG. 5, the locking ring 410 preferably has a head 422 at the outward 260 end of the ring 410 to which the handle 418 is pivotally connected, and the head 422 has a larger outer diameter than the exterior splines 414 of the locking ring 410. In addition, the system 400 preferably includes a gasket 424 sized to fit around the exterior splines 414 of the locking ring 410 and against an inward 255 side of the head 422. The gasket 424 may form a seal that helps to prevent water, dirt, debris, or other contaminants from getting into the interior of the hub 212 when the locking ring 410 is installed within the hub 212. The second circular indentation 510 is sized to receive the head 422 of the locking ring 410 and the gasket 424, as shown in FIG. 13. The outer diameters of both the head 422 of the locking ring 410 and the gasket 424 are slightly smaller than the internal diameter of the central opening of the end plate 304 so that the locking ring 410 may be inserted through the central opening of the end plate 304.

Figure 10:
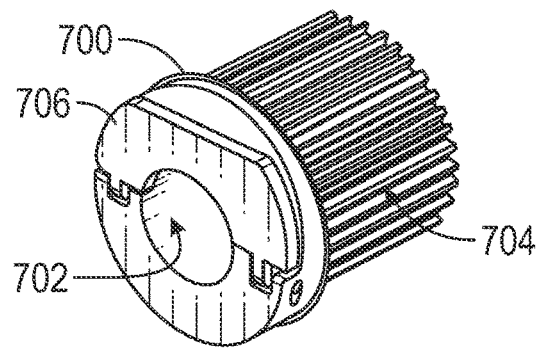
FIG. 10 shows a perspective view of a placeholder ring for use in a locking hub system in accordance with the present disclosure.

In a preferred embodiment, as shown in FIG. 10, the locking hub system 400 may further comprise a placeholder ring 700, which is a separate component than the locking ring 410. The placeholder ring 700 may be installed in the same manner as the locking ring 410, but the placeholder ring 700 has a smooth interior surface 702 and thus does not prevent rotation of the hub 212 and wheel 110, as does the locking ring 410. Thus, the placeholder ring 700 may be installed in place of the locking ring 410 at times when the vehicle 100 will be operated in a normal manner, at which time the hub 212 must be able to freely rotate about the axle 202. A gasket 424 is preferably also utilized with the placeholder ring 700 to form a seal, which helps to prevent water or debris from getting into the interior of the hub 212. The placeholder ring 700 preferably also has a handle 706 for inserting and removing the placeholder ring 700. Although the placeholder ring 700 has a smooth interior surface 702, the ring 700 preferably has exterior splines 704 configured to mate with the interior splines 240 of the hub 212 to retain the ring 700 in place. The placeholder ring 700 has an internal diameter that is larger than an external diameter of the exterior splines 204 of the axle 202 to allow the hub 212 to freely rotate about the axle 202 when the exterior splines 704 of the placeholder ring 700 are mated with the interior splines 240 of the hub 212. The placeholder ring 700 also cannot be removed from an interior of the hub 212 when the hub cap 600 is locked onto the hub 212.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A locking hub system comprising:
    a hub coupled to an axle, wherein the hub has interior splines, and wherein the axle has exterior splines;
    a manually positionable locking ring having interior splines and having exterior splines, wherein the exterior splines of the locking ring are configured to mate with the interior splines of the hub, and wherein the interior splines of the locking ring are configured to mate with the exterior splines of the axle, wherein the locking ring is not operably connected to an actuator,
    wherein the hub is rotationally fixed relative to the axle when the exterior splines of the locking ring are mated with the interior splines of the hub and the interior splines of the locking ring are mated with the exterior splines of the axle, and wherein the hub is free to rotate about the axle when the locking ring is removed; and
    a hub cap and a lock configured to securely lock the hub cap onto the hub, wherein the locking ring cannot be removed from an interior of the hub when the hub cap is locked onto the hub.

2. The locking hub system of claim 1, wherein the hub cap is retained on the hub by only the lock when the hub cap is locked onto the hub with the lock, and wherein the hub cap is removable when the lock is unlocked.

3. The locking hub system of claim 1, wherein the locking ring comprises a handle.

4. The locking hub system of claim 3, wherein the handle is pivotally connected to the locking ring by a hinge.

5. The locking hub system of claim 1, further comprising a placeholder ring having exterior splines configured to mate with the interior splines of the hub and a smooth interior surface, wherein the placeholder ring has an internal diameter greater than an external diameter of the exterior splines of the axle, wherein the hub is free to rotate about the axle when the exterior splines of the placeholder ring are mated with the interior splines of the hub.

6. The locking hub system of claim 5, wherein the placeholder ring cannot be removed from an interior of the hub when the hub cap is locked onto the hub.

7. The locking hub system of claim 1, wherein the hub has a circular groove positioned around an internal circumference of the hub, wherein the lock comprises a lever that inserts into the groove in response to actuating the lock, thereby securely locking the hub cap onto the hub.

8. The locking hub system of claim 1, wherein the axle has a threaded section having helical threads, wherein the exterior splines of the axle are disposed at a distal end of the axle, and wherein the system further comprises a threaded fastener having helical threads that are compatible with the threads on the axle.

9. The locking hub system of claim 1, wherein the axle is mounted in a rotationally fixed position.

10. A conveyance vehicle having at least one wheel mounted on a locking hub system, wherein the locking hub system comprises:
    a hub coupled to an axle, wherein the hub has interior splines, and wherein the axle has exterior splines;
    a manually positionable locking ring having interior splines and having exterior splines, wherein the exterior splines of the locking ring are configured to mate with the interior splines of the hub, and wherein the interior splines of the locking ring are configured to mate with the exterior splines of the axle, wherein the locking ring is not operably connected to an actuator,
    wherein the hub is rotationally fixed relative to the axle when the exterior splines of the locking ring are mated with the interior splines of the hub and the interior splines of the locking ring are mated with the exterior splines of the axle, and wherein the hub is free to rotate about the axle when the locking ring is removed; and
    a hub cap and a lock configured to securely lock the hub cap onto the hub, wherein the locking ring cannot be removed from an interior of the hub when the hub cap is locked onto the hub.

11. The conveyance vehicle of claim 10, wherein the hub cap is retained on the hub by only the lock when the hub cap is locked onto the hub with the lock, and wherein the hub cap is removable when the lock is unlocked.

12. The conveyance vehicle of claim 10, wherein the locking ring comprises a handle.

13. The conveyance vehicle of claim 12, wherein the handle is pivotally connected to the locking ring by a hinge.

14. The conveyance vehicle of claim 10, further comprising a placeholder ring having exterior splines configured to mate with the interior splines of the hub and a smooth interior surface, wherein the placeholder ring has an internal diameter greater than an external diameter of the exterior splines of the axle, wherein the hub is free to rotate about the axle when the exterior splines of the placeholder ring are mated with the interior splines of the hub.

15. The conveyance vehicle of claim 14, wherein the placeholder ring cannot be removed from an interior of the hub when the hub cap is locked onto the hub.

16. The conveyance vehicle of claim 10, wherein the hub has a circular groove positioned around an internal circumference of the hub, wherein the lock comprises a lever that inserts into the groove in response to actuating the lock, thereby securely locking the hub cap onto the hub.

17. The conveyance vehicle of claim 10, wherein the axle has a threaded section having helical threads, wherein the exterior splines of the axle are disposed at a distal end of the axle, and wherein the system further comprises a threaded fastener having helical threads that are compatible with the threads on the axle.

18. The conveyance vehicle of claim 10, wherein the axle is mounted in a rotationally fixed position.

* * * * *